(12) United States Patent
Liu et al.

(10) Patent No.: US 7,614,790 B2
(45) Date of Patent: Nov. 10, 2009

(54) LINEAR DRIVING DEVICE WITH A SELF-LUBRICATING ASSEMBLY

(75) Inventors: Shin-Tai Liu, Taichung (TW); Min-Yao Hsieh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 420 days.

(21) Appl. No.: 11/748,623

(22) Filed: May 15, 2007

(65) Prior Publication Data

US 2008/0285898 A1 Nov. 20, 2008

(51) Int. Cl.
*F16H 29/04* (2006.01)

(52) U.S. Cl. .............................. 384/13; 384/15; 384/45; 184/5; 184/13.1

(58) Field of Classification Search ............. 384/13–16, 384/43–45; 184/3.1, 5, 15.1, 21–22
See application file for complete search history.

(56) References Cited

U.S. PATENT DOCUMENTS

| 5,311,788 | A | * | 5/1994 | Kasuga ..................... 74/89.33 |
| 5,590,965 | A | * | 1/1997 | Yabe et al. .................... 384/45 |
| 5,694,811 | A | * | 12/1997 | Tsukada ...................... 74/467 |
| 5,761,960 | A | * | 6/1998 | Nagai et al. .................... 384/50 |
| 6,082,899 | A | * | 7/2000 | Suzuki et al. .................. 184/5 |
| 6,123,457 | A | * | 9/2000 | Suzuki et al. .................. 384/13 |
| 6,155,717 | A | * | 12/2000 | Michioka et al. .............. 384/15 |
| 6,176,617 | B1 | * | 1/2001 | Kamimura et al. ............ 384/13 |
| 6,257,766 | B1 | * | 7/2001 | Agari ......................... 384/45 |
| 6,290,394 | B1 | * | 9/2001 | Obara et al. .................... 384/13 |
| 6,401,867 | B1 | * | 6/2002 | Michioka et al. ............... 184/5 |
| 6,435,718 | B1 | * | 8/2002 | Weiss et al. .................... 384/13 |
| 6,461,045 | B1 | * | 10/2002 | Kamimura et al. ............ 384/13 |
| 6,634,246 | B2 | * | 10/2003 | Ohya et al. ................ 74/89.44 |
| 6,988,517 | B1 | * | 1/2006 | Hsu et al. ...................... 141/67 |
| 7,070,041 | B1 | * | 7/2006 | Dirschbacher et al. ... 198/750.1 |
| 7,556,430 | B2 | * | 7/2009 | Wu et al. ...................... 384/13 |
| 2005/0184597 | A1 | * | 8/2005 | Schroeder et al. ............. 310/12 |
| 2006/0215943 | A1 | * | 9/2006 | Agari et al. .................... 384/13 |

FOREIGN PATENT DOCUMENTS

JP 10184683 A * 7/1998
JP (2002-48137 A * 2/2002

* cited by examiner

*Primary Examiner*—Marcus Charles
(74) *Attorney, Agent, or Firm*—Banger Shia

(57) ABSTRACT

A self-lubricating assembly for a linear driving device comprises an oil applying subassembly, an oil transmitting subassembly and an oil container. The oil transmitting subassembly transmits lubricating oil from the oil container to the oil applying subassembly, and the oil applying subassembly is driven by the linear driving device to perform lubricating action automatically. The oil container is provided for storing lubricating oil to prolong lubricating time of the linear driving device.

10 Claims, 10 Drawing Sheets

LINEAR DRIVING DEVICE WITH A SELF-LUBRICATING ASSEMBLY

BACKGROUND OF THE INVENTION

1. Field of the Invention

The present invention relates to a linear driving device, and more particularly to a linear driving device with a self-lubricating assembly.

2. Description of the Prior Art

A conventional linear driving device comprises a guideway, a slide block and a screw. The slide block is slideablely assembled on the guideway. The screw is screwed in the slide block. When the screw rotates, it drives the slide block to slide linearly along the guideway. During the course of rotation of the screw or the linear slide of the slide block, it will produce friction, and the friction will change kinetic energy into heat energy, causing energy loss. Therefore, the linear driving device should be lubricated by lubricating oil for improving energy transmission efficiency.

Conventional methods for lubricating the linear driving device include dispersing lubricating and centralized lubricating. The former refers to a method for manually and regularly supplying oil to the linear driving device with an oil gun, and the latter method is to manually or automatically supply oil to the linear driving device through a pipeline.

Both of the above-mentioned two methods supply oil from the outside, so lubricating oil is likely to drip or to be overly supplied, so it is wasteful, or the lubricating oil is insufficiently supplied and consequently causing insufficient lubrication.

The present invention has arisen to mitigate and/or obviate the afore-described disadvantages.

SUMMARY OF THE INVENTION

The primary objective of the present invention is to provide a self-lubricating assembly for a linear driving device that is assembled in a linear driving device and can lubricate the linear driving device automatically when the slide block moves.

The secondary objective of the present invention is to provide a self-lubricating assembly for a linear driving device, wherein an oil container is supplied with plenty of lubricating oil for prolonging lubricating time of the linear driving device.

The third objective of the present invention is to provide a self-lubricating assembly for a linear driving device, wherein the oil container is easy to assemble or disassemble since it is detachably disposed on the connecter.

The fourth objective of the present invention is to provide a self-lubricating assembly for a linear driving device, wherein an oil transmitting member is disposed around the inner periphery of the storing tank, so it can absorb the lubricating oil in every corner of the storing tank.

The self-lubricating assembly for the linear driving device of the present invention is assembled on the slide block of the linear driving device. When the slide block slides on the guideway, the self-lubricating assembly is driven to perform lubricating action. The self-lubricating assembly is provided with an oil container, which is used for storing lubricating oil for increasing the oil reserve in the self-lubricating assembly and prolonging lubricating time of the linear driving device. The oil container is easy to assemble or disassemble since it is detachably disposed on the connecter. In addition, an oil transmitting member is disposed around the inner periphery of the storing tank, so it can absorb the lubricating oil in every corner of the storing tank.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
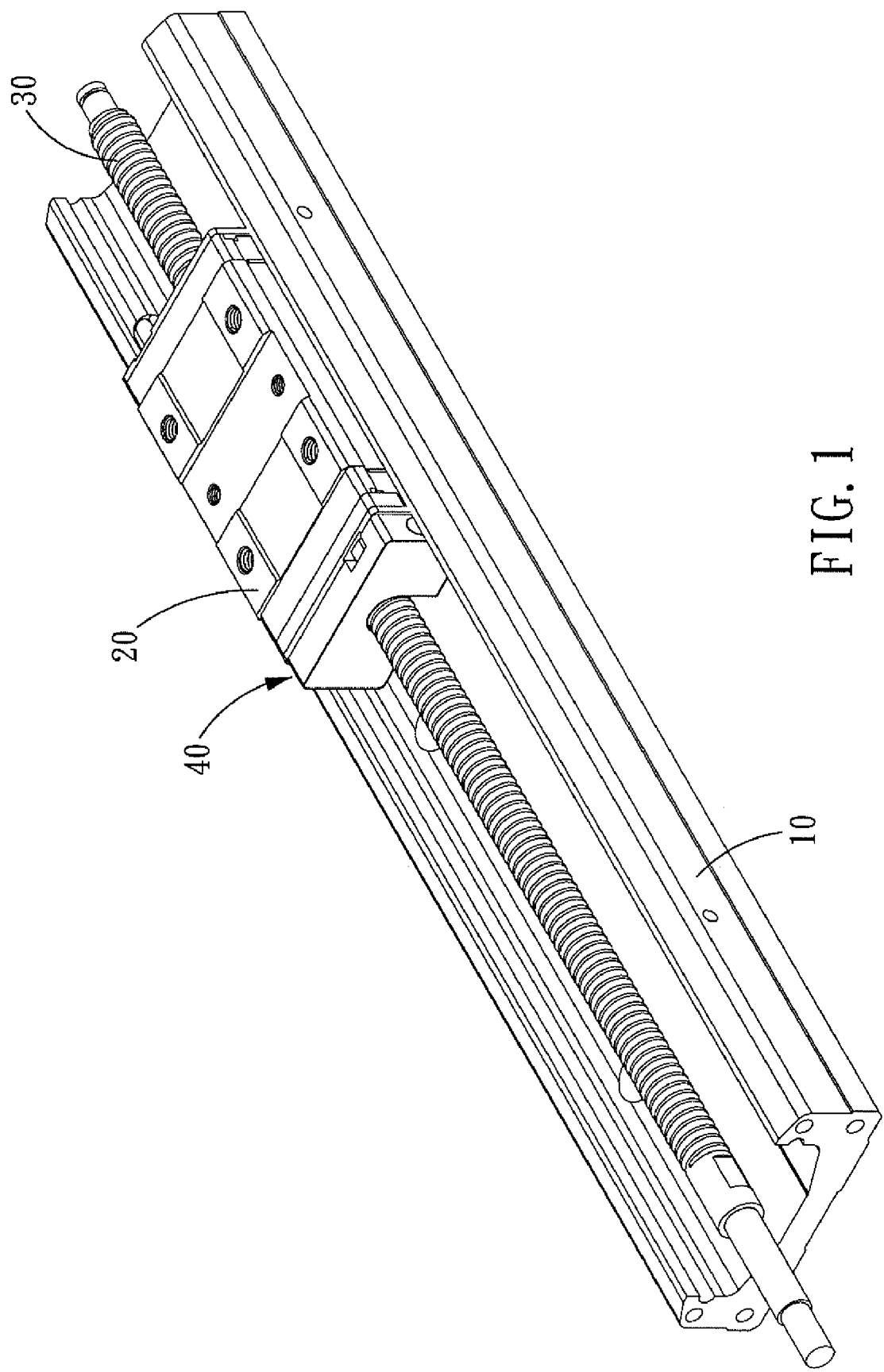
FIG. 1 is a perspective view of a linear driving device with a self-lubricating assembly in accordance with an embodiment of the present invention.
Figure 2:
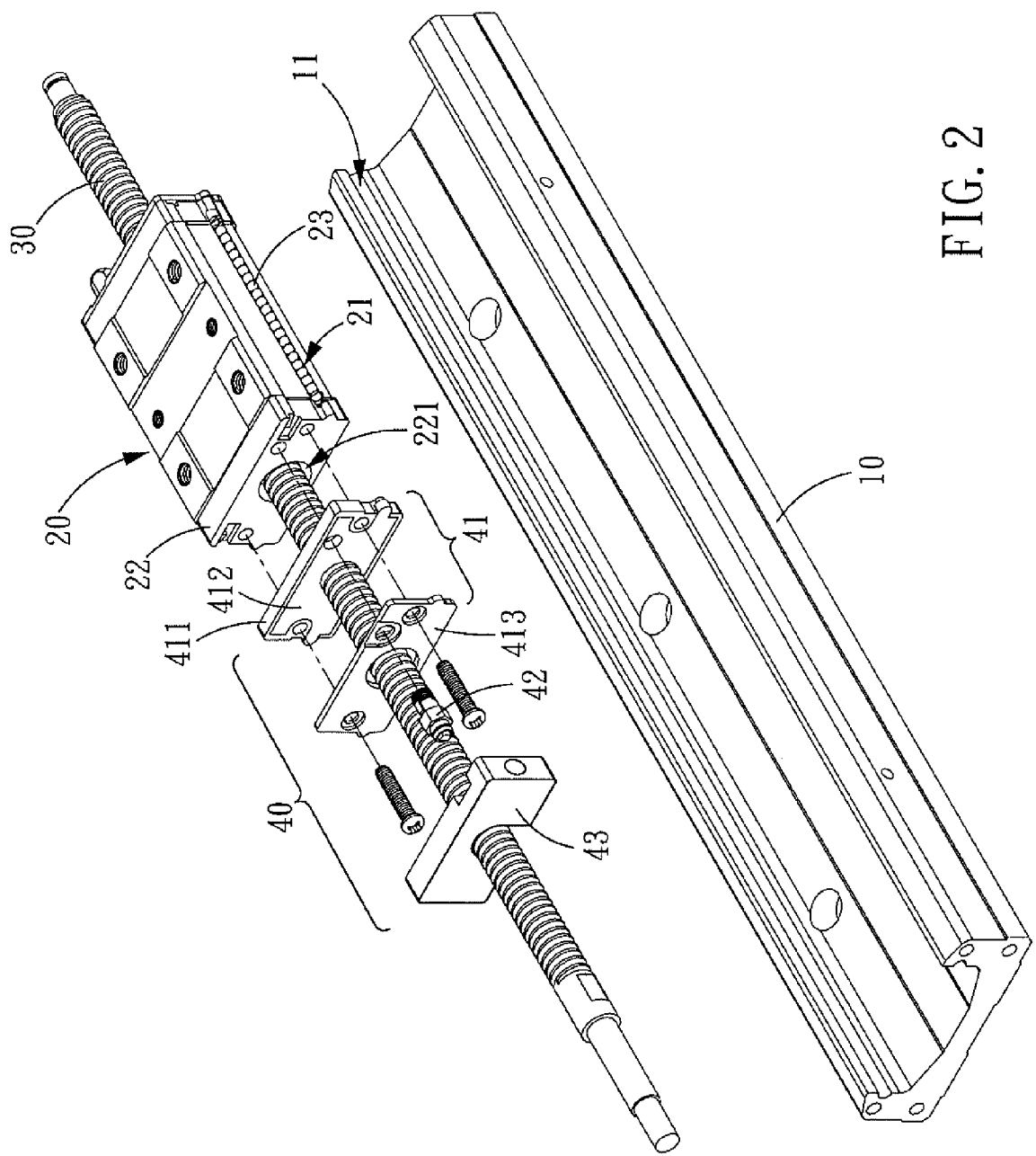
FIG. 2 is an exploded view of the linear driving device with a self-lubricating assembly in accordance with the embodiment of the present invention.

Referring to FIGS. 1 and 2, a linear driving device with a self-lubricating assembly in accordance with the present invention comprises a guideway 10, a slide block 20, a screw 30 and a self-lubricating assembly 40.

An elongated guiding groove 11 is defined in the inner surface of either side of the guideway 10 respectively.

Two grooves 21 are defined at both sides of the slide block 20 and located correspondingly to the elongated guiding grooves 11 of the guideway 10 respectively. A plurality of rolling elements 23 is disposed between each of the two elongated guiding groove 11 of the guideway 10 and the corresponding groove 21 of the slide block 20. The slide block 20 is slideably mounted on the guideway 10 via the rolling elements 23. A threaded hole (not shown) penetrates the slide block 20 and located in the sliding direction of the slide block 20, and an end cap 22 with a through hole 221 is mounted at either of the slide block 20 for confining the rolling elements 23 in the slide block 20.

The screw 30 is screwed through the through holes 221 of the end caps 22 into the threaded hole (not shown) of the slide block 20. By rotating the screw 30, the slide block 20 can be driven to slide linearly on the guideway 10.

The self-lubricating assembly 40 is inserted on the screw 30 and is fixed on one of the end caps 22 of the slide block 20. The self-lubricating assembly 40 includes an oil applying subassembly 41, an oil transmitting subassembly 42, and an oil container 43.

Figure 3:
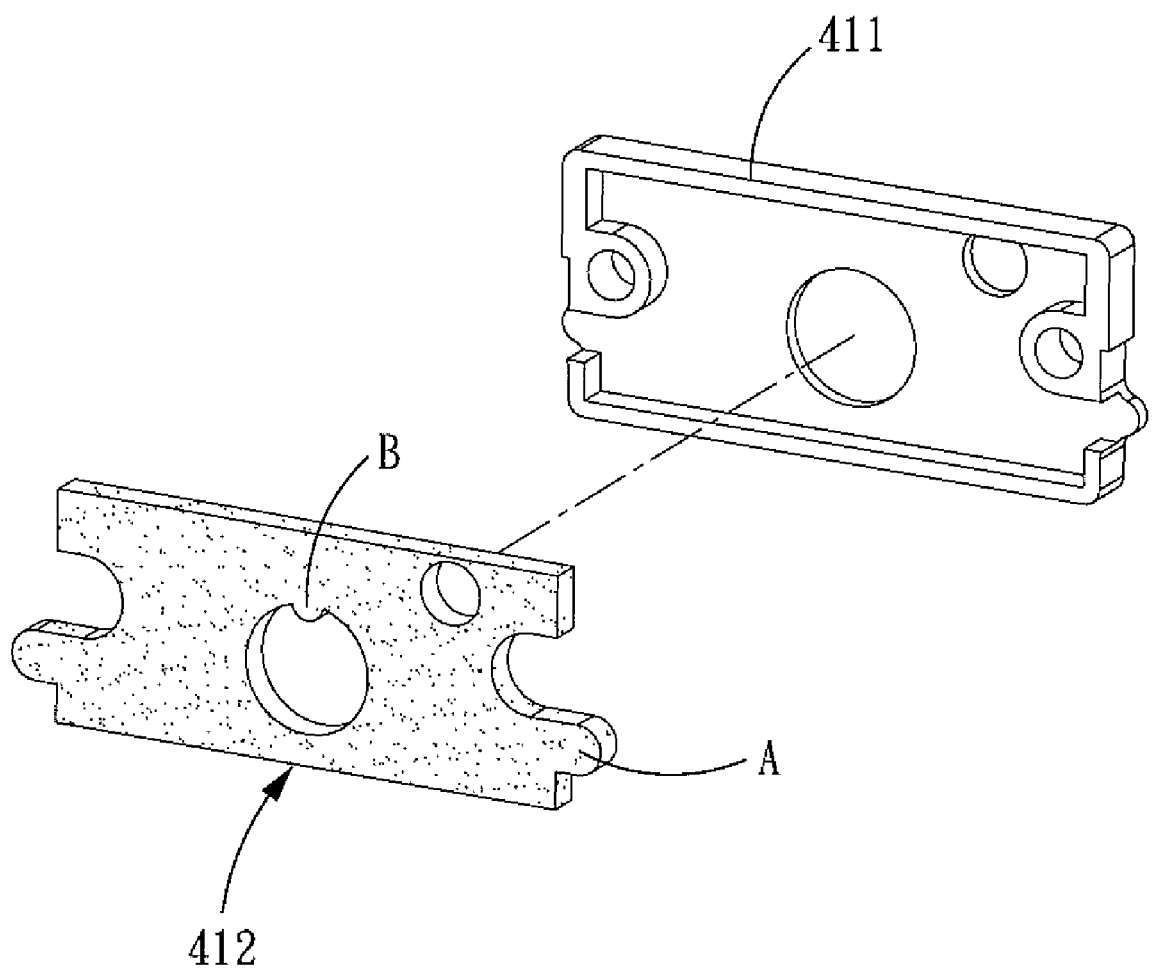
FIG. 3 is a perspective view of the fixing seat and the oil applying piece in accordance with the embodiment of the present invention.
Figure 4:
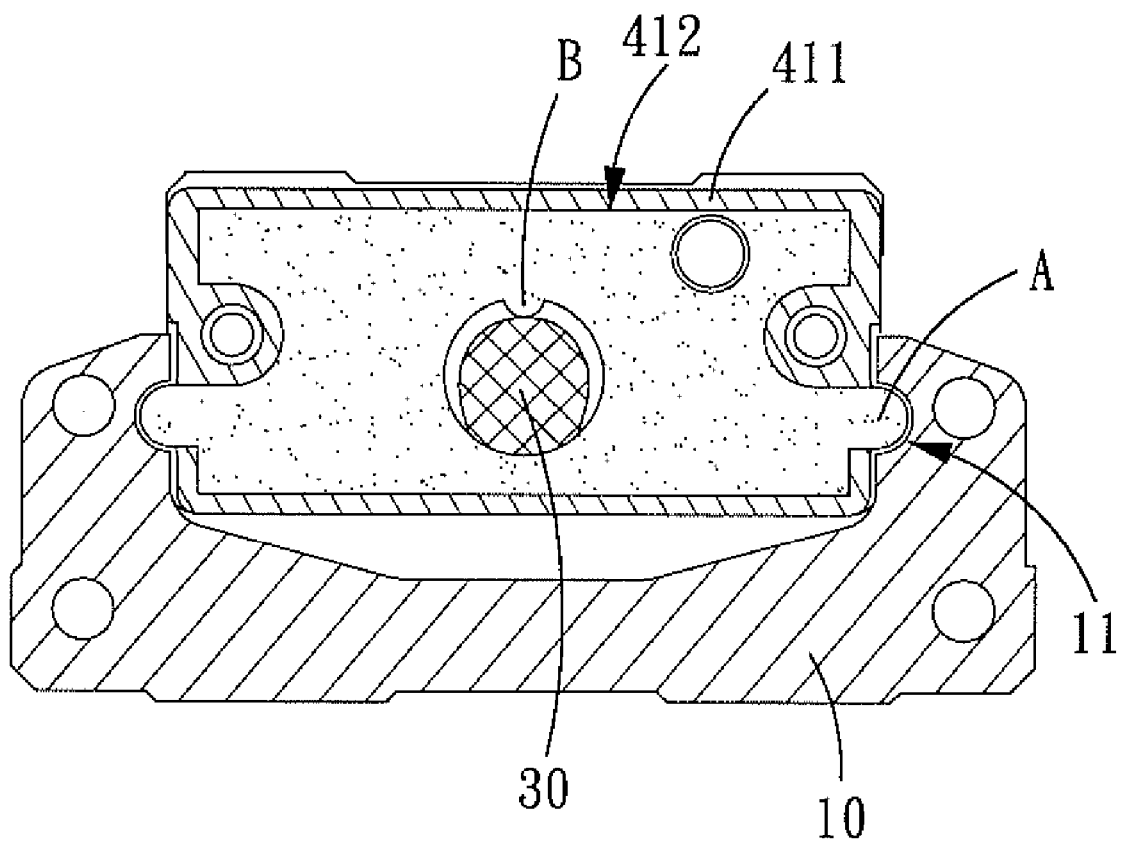
FIG. 4 is a perspective view of the linear driving device with a self-lubricating assembly in accordance with the embodiment of the present invention of showing that the oil applying piece is applying lubricating oil to the guideway and the screw.

The oil applying subassembly 41 as shown in FIGS. 3-4, is fixed on one of the end caps 22 by screws, and the oil applying subassembly 41 comprises a fixing seat 411, an oil applying piece 412 and a cover 413. The oil applying piece 412 is fixed on the fixing seat 411, and the cover 413 covers the fixing seat 411. The oil applying piece 412 is restricted between the cover 413 and the fixing seat 411. A plurality of protruding portions A and B is formed on the oil applying piece 412 for contacting the elongated guiding grooves 11 of the guideway 10 and the screw 30.

Figure 5:
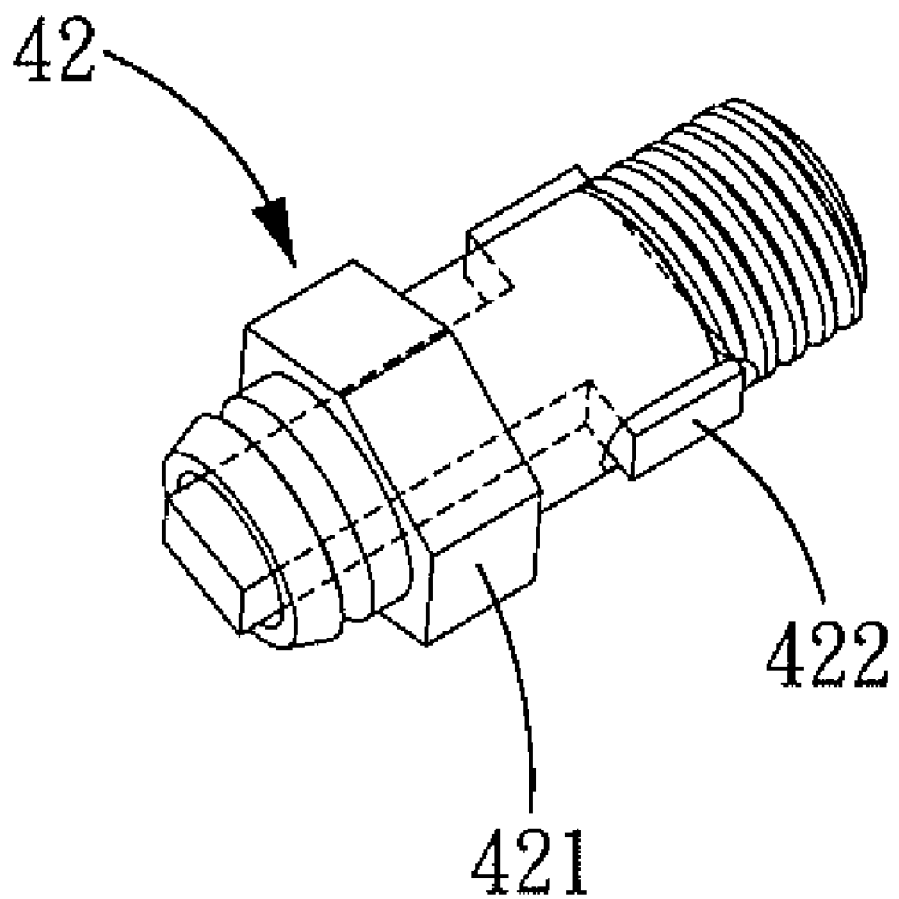
FIG. 5 is a perspective view of the oil transmitting subassembly in accordance with the embodiment of the present invention.
Figure 6:
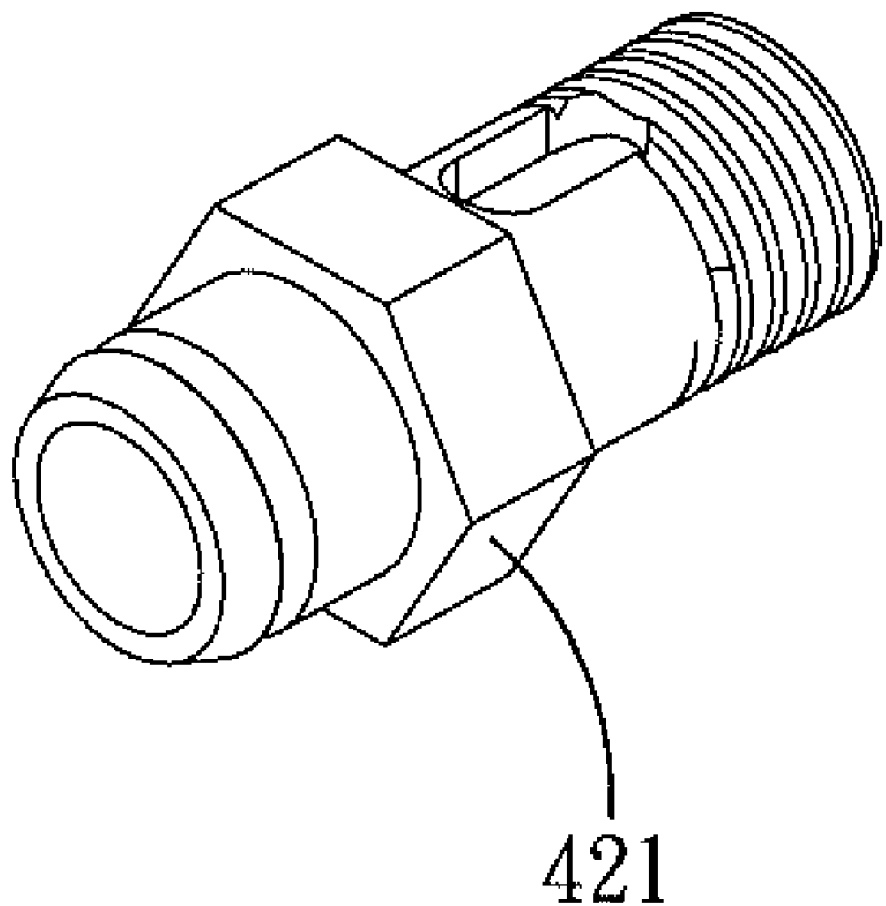
FIG. 6 is a perspective view of the connecter in accordance with the embodiment of the present invention.

The oil transmitting subassembly 42 as shown in FIGS. 5-6 includes a connecter 421 and an oil-containing substance 422. The connecter 421, with one end inserting through the oil applying subassembly 41, is pipe-shaped and fixed on one of the end caps 22. The oil-containing substance 422 is fixed in the connecter 421 in such a manner that both ends of the oil-containing substance 422 protrude from the connecter 421, and one end of the oil-containing substance 422 contacts the oil applying piece 412 of the oil applying subassembly 41.

Figure 7:
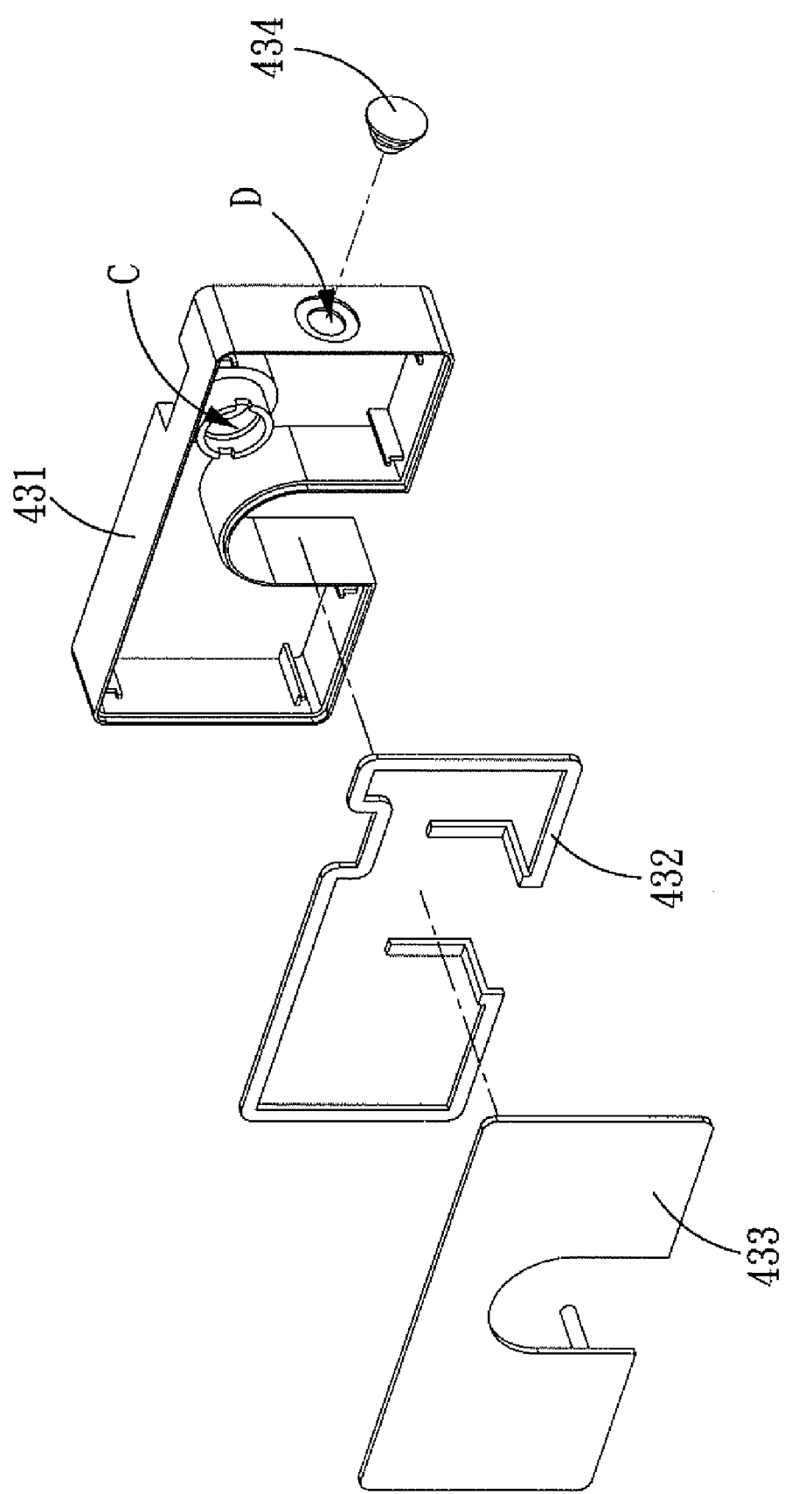
FIG. 7 is an exploded view of the oil container in accordance with the embodiment of the present invention.
Figure 8:
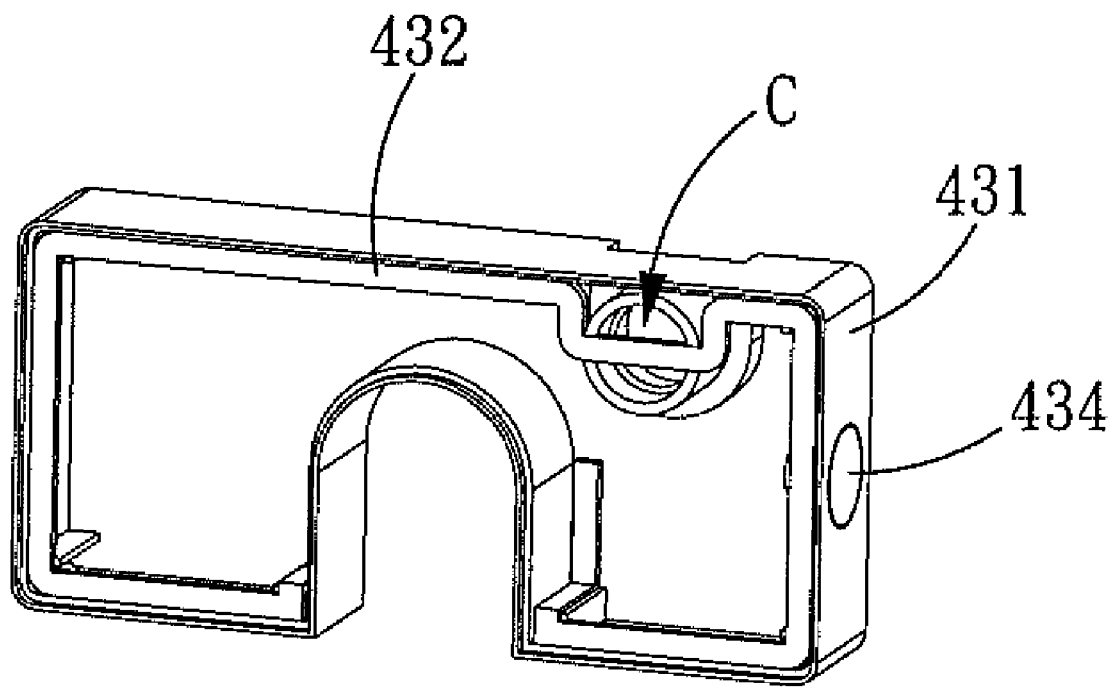
FIG. 8 is a perspective view in accordance with the present invention of showing that the oil transmitting member is fixed in the storing tank.
Figure 9:
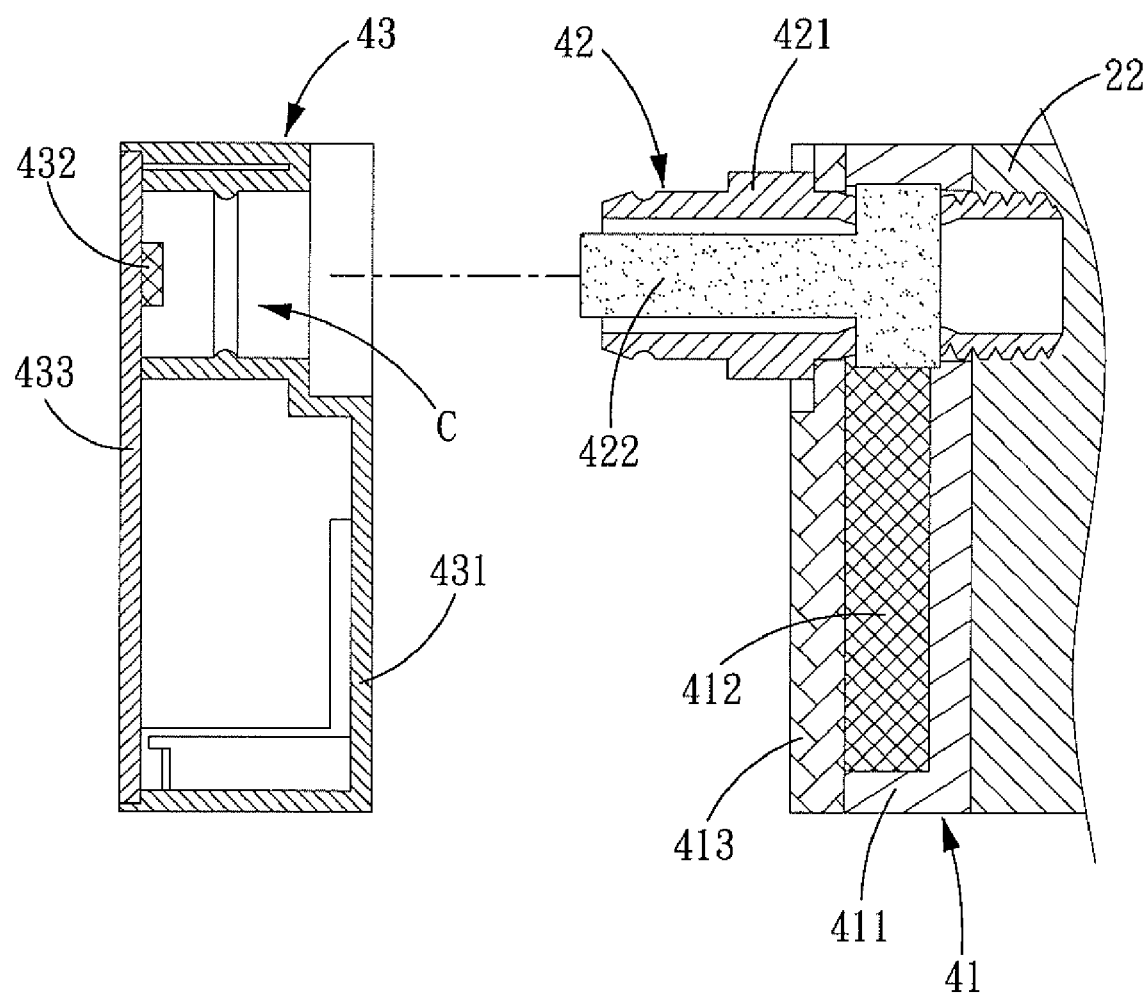
FIG. 9 is a perspective view in accordance with the embodiment of the present invention of showing that the oil container is to be assembled with the oil transmitting subassembly.
Figure 10:
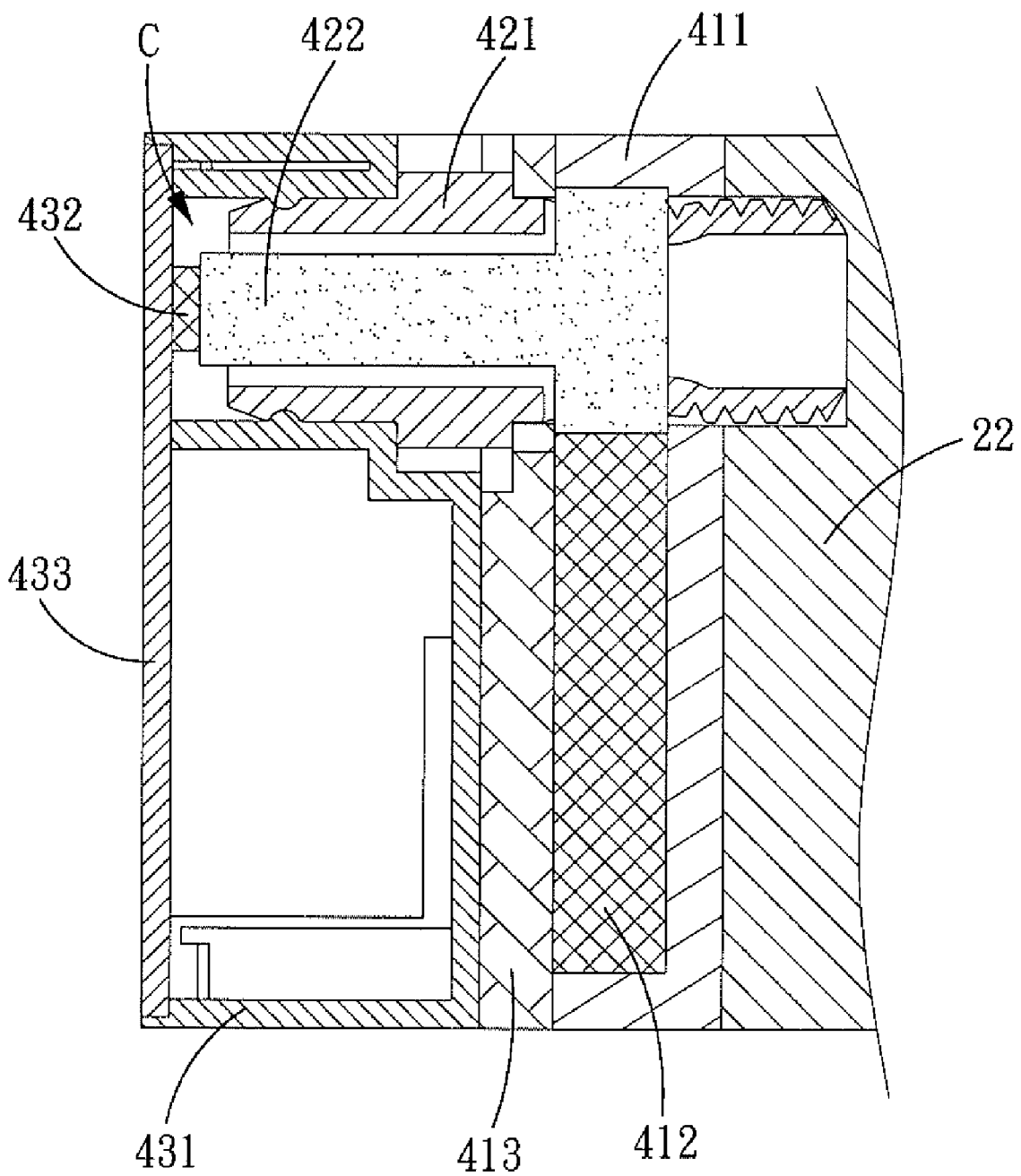
FIG. 10 is a cross sectional view of the self-lubricating assembly in accordance with the embodiment of the present invention.

The oil container 43 as shown in FIGS. 7-8 includes a storing tank 431, an oil transmitting member 432, a tank cover 433 and a plug 434. The storing tank 431 is provided with a through hole C and a feeding hole D. The oil transmitting member 432 is vertically or horizontally disposed around the inner periphery of the storing tank 431. The storing tank 431 is sealed with the tank cover 433, so that lubricating oil can be stored therein. The oil transmitting member 432 contacts lubricating oil and connects the outside via the through hole C. The feeding hole D is sealed with the plug 434. The through hole C enables the oil container 43 to be detachably fixed at another end of the connecter 421. The oil transmitting member 432 contacts another end of the oil-containing substance 422 of the connecter 421. The oil transmitting member 432, the oil-containing substance 422 and the oil applying piece 412 are connected in series to form an oil circuit. The oil transmitting member 432, the oil-containing substance 422 and the oil applying piece 412 can be porous structures (such as wool felts or sponges) for absorbing lubricating oil. The oil applying subassembly 41, the oil transmitting subassembly 42 and the oil container 43 of the self-lubricating assembly 40 are assembled as shown in FIGS. 9 and 10.

When the slide block 20 slides on the guideway 10, the self-lubricating assembly 40 is driven to move, and at the same time, the protruding portions A, B of the oil applying piece 412 of the oil applying subassembly 41 contact and apply lubricating oil to the two elongated guiding grooves 11 and the screw 30.

The oil container 43 is provided for storing lubricating oil. After the oil applying piece 412 finishes the abovementioned lubricating action, lubricating oil will be automatically transmitted by capillary action to the oil applying piece 412 through the oil transmitting member 432 and the oil-containing substance 422, thus increasing the oil reserve in the self-lubricating assembly 40 and prolonging the lubricating time of the linear driving device.

As it can be understood from the abovementioned method, the linear driving device with a self-lubricating assembly of the present invention can effectively apply lubricating oil to the elongated guiding grooves 11 of the guideway 10 and the screw 30 by the oil applying piece 412 of the oil applying subassembly 41 without the problem of oil dripping, thus saving lubricating oil and keeping the environment clean.

The oil container 43 is easy to assemble and disassemble since it is detachably disposed on the connecter 421 of the oil transmitting subassembly 42. If the lubricating oil level is low, it is quite convenient for the user to supply lubricating oil to the device through the feeding hole D of the storing tank 431.

In addition, the oil transmitting member 432 is disposed around the inner periphery of the storing tank 431, so it can absorb the lubricating oil in every corner of the storing tank 431 to supply lubricating oil to the oil applying piece 412. By such arrangements, the present invention not only improves the use efficiency of the lubricating oil, but also reduces environment pollution.

To sum up, the present invention relates to a linear driving device with a self-lubricating assembly. The self-lubricating assembly comprises an oil applying subassembly, an oil transmitting subassembly and an oil container. The oil transmitting subassembly transmits lubricating oil from the oil container to the oil applying subassembly, and the oil applying subassembly is driven by the linear driving device to perform lubricating action automatically. The oil container is provided for storing lubricating oil to prolong lubricating time of the linear driving device.

While we have shown and described various embodiments in accordance with the present invention, it is clear to those skilled in the art that further embodiments may be made without departing from the scope of the present invention.

What is claimed is:

1. A linear driving device with a self-lubricating assembly comprising: a slide block slideably disposed on a guideway, an elongated guiding grooves being defined in an inner surface of either side of the guideway respectively, two grooves being defined at both sides of the slide block and located correspondingly to the elongated guiding grooves of the guideway, a plurality of rolling elements disposed between each of the two elongated guiding grooves of the guideway and the corresponding groove of the slide block, a threaded hole penetrating the slide block and being located in a sliding direction of the slide block, and an end cap with a through hole being mounted at either end of the slide block, a screw screwed into the threaded hole of the slide block through the through holes of the end caps; characterized in that:

a self-lubricating assembly is inserted on the screw and fixed on one of the end caps of the slide block and includes an oil applying subassembly, an oil transmitting subassembly, and an oil container, wherein:

the oil applying subassembly is fixed on a surface of one of the end caps and includes a fixing seat and an oil applying piece, the oil applying piece is located in the fixing seat, a plurality of protruding portions is formed on the oil applying piece for contacting the elongated guiding grooves of the guideway and the screw;

the oil transmitting subassembly includes a connecter and an oil-containing substance, the connecter, with one end inserting through the oil applying subassembly, is fixed on one of the two end caps, and the oil-containing substance is disposed in the connecter and one end of the oil-containing substance contacts the oil applying piece of the oil applying subassembly; and the oil container provided for storing lubricating oil is detachably fixed at the other end of the connector of the oil transmitting subassembly, and the oil container is provided with an oil transmitting member that contacts the other end of the oil-containing substance of the connecter, and the oil transmitting member, the oil-containing substance and the oil applying piece are connected in series to form an oil circuit.

2. The linear driving device with a self-lubricating assembly as claimed in claim 1, wherein the oil transmitting member of the oil container, the oil-containing substance of the oil transmitting subassembly, and the oil applying piece of the oil applying subassembly are porous structures.

3. The linear driving device with a self-lubricating assembly as claimed in claim 2, wherein the oil transmitting member of the oil container, the oil-containing substance of the oil transmitting subassembly, and the oil applying piece of the oil applying subassembly are wool felts.

4. The linear driving device with a self-lubricating assembly as claimed in claim 2, wherein the oil transmitting member of the oil container, the oil-containing substance of the oil transmitting subassembly, and the oil applying piece of the oil applying subassembly are sponges.

5. The linear driving device with a self-lubricating assembly as claimed in claim 1, wherein a cover covers the fixing seat of the oil applying subassembly, and the oil applying piece is restricted between the cover and the fixing seat, and the plurality of protruding portions of the oil applying piece protrude from the fixing seat.

6. The linear driving device with a self-lubricating assembly as claimed in claim 1, wherein the connecter of the oil transmitting subassembly is pipe-shaped, and both ends of the oil-containing substance protrude out of the connecter and contact the oil applying piece of the oil applying subassembly.

7. The linear driving device with a self-lubricating assembly as claimed in claim 1, wherein the oil container includes a storing tank, a tank cover and the oil transmitting member, the storing tank is provided with a through hole, the oil transmitting member is disposed around an inner periphery of the storing tank, and the storing tank is sealed with the tank cover for storing lubricating oil, and the oil transmitting member contacts lubricating oil and is connected to outside by the through hole, and the oil container is detachably fixed at the other end of the connecter.

8. The linear driving device with a self-lubricating assembly as claimed in claim 7, wherein the storing tank is provided with a feeding hole and a plug for sealing the feeding hole.

9. The linear driving device with a self-lubricating assembly as claimed in claim 7, wherein the oil transmitting member is vertically disposed around the inner periphery of the storing tank.

10. The linear driving device with a self-lubricating assembly as claimed in claim 7, wherein the oil transmitting member is horizontally disposed around the inner periphery of the storing tank.

* * * * *